(12) United States Patent
Kapoor et al.

(10) Patent No.: US 10,049,142 B1
(45) Date of Patent: Aug. 14, 2018

(54) MULTI-STEP CODE GENERATION FOR BI PROCESSES

(71) Applicant: Numerify, Inc., Cupertino, CA (US)

(72) Inventors: Rahul Kapoor, Cupertino, CA (US); Gaurav Rewari, Cupertino, CA (US); Sadanand Sahasrabudhe, Rockville, MD (US)

(73) Assignee: Numerify, Inc., San Jose, CA (US)

( * ) Notice: Subject to any disclaimer, the term of this patent is extended or adjusted under 35 U.S.C. 154(b) by 479 days.

(21) Appl. No.: 14/543,680

(22) Filed: Nov. 17, 2014

Related U.S. Application Data

(60) Provisional application No. 62/037,087, filed on Aug. 13, 2014.

(51) Int. Cl.
*G06F 17/30* (2006.01)
*H04L 29/08* (2006.01)

(52) U.S. Cl.
CPC ........ *G06F 17/30563* (2013.01); *H04L 67/10* (2013.01)

(58) Field of Classification Search
CPC ........................... G06F 17/30563; H04L 67/10
See application file for complete search history.

(56) References Cited

U.S. PATENT DOCUMENTS

| | | | | |
|---|---|---|---|---|
| 7,051,334 B1* | 5/2006 | Porter | ............. | H04L 12/66 709/201 |
| 9,411,864 B2* | 8/2016 | Glider | ............. | G06F 17/30578 |
| 9,507,838 B2* | 11/2016 | Leigh | ............. | G06F 17/30563 |
| 2011/0295792 A1* | 12/2011 | Mascarenhas | .... | G06F 17/30489 707/601 |
| 2013/0144833 A1* | 6/2013 | Ivanova | ............. | G06F 17/30592 707/600 |
| 2014/0146648 A1* | 5/2014 | Alber | ............. | G11B 27/002 369/53.1 |
| 2014/0244573 A1* | 8/2014 | Gonsalves | ........ | G06F 17/30592 707/606 |
| 2014/0317617 A1* | 10/2014 | O'Donnell | .......... | G06F 9/45533 718/1 |
| 2014/0344211 A1* | 11/2014 | Allan | ............. | G06F 17/30563 707/602 |
| 2015/0347542 A1* | 12/2015 | Sullivan | ............. | G06F 17/30563 707/602 |
| 2016/0104002 A1* | 4/2016 | Schneider | ......... | G06F 17/30563 726/1 |

* cited by examiner

*Primary Examiner* — Leslie Wong
(74) *Attorney, Agent, or Firm* — Rahman LLC (57) ABSTRACT

A source computing environment administering business intelligence (BI) processing at a target computing environment. The source computing environment storing intermediate design plans for creating dimensional models, reports, and ETL jobs for deployment in a plurality of different computing environments. At the source computing environment, target specific modules translating the one or more intermediate design plans into one or more target specific plans for dimensional models, reports, and ETL job plans which are interpretable or executable by the target computing environment. The source computing environment, in consultation with a workflow engine, instructing the target computing environment to provision data repositories, create reports, and perform ETL processing based on the one or more target specific plans.

24 Claims, 5 Drawing Sheets

MULTI-STEP CODE GENERATION FOR BI PROCESSES

CLAIM OF PRIORITY

This application claims priority to U.S. provisional patent application No. 62/037,087, filed Aug. 13, 2014, entitled "External Feeds and Model Driven, Tool Agnostic Multi Step Code Generation Approach for BI Processes Facilitating Cross Cloud BI," the contents of which are hereby incorporated by reference for all purposes as if fully set forth herein.

FIELD OF THE INVENTION

Embodiments of the invention relate to performing business intelligence operations across a network.

BACKGROUND

Organizations and businesses are often comprised of various operational units having different data storage and reporting requirements. For example, the financial department of a company may need financial reports generated from data stored in one database, while the marketing department may need access to information stored in an entirely separate database. Each database may store data in a different schema or format, and so a single company may use many databases and/or applications, each of which expects data to be stored or organized in a different manner.

Rather than maintaining, at considerable expense and complexity, the hardware and software resources to operate their own set of data management applications, a company may instead choose to make use of one or more cloud-based data management applications. A cloud-based data management application is a data management application that is operated by a different party (termed "the cloud application provider" or "the operator of a cloud-based application") than the company using the cloud-based application. The company using the cloud-based application may access the cloud-based application over the Internet (colloquially named the "cloud," hence the origin of the term cloud-based application).

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for performing business intelligence operations using a multi-step code generation approach, facilitating business intelligence operations within the service provider's cloud, in a partner's cloud, between the service provider and partner clouds, or on customer premises are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention provide for administering business intelligence operations. Approaches are discussed herein for business intelligence (BI) operations of one or more cloud-based application providers to be managed either locally using software resident on-site or across a network by a business intelligence (BI) administrator. A cloud-based application provider is a company which in the business of selling access to one or more cloud-based data management applications. The cloud-based application provider may lack the ability to perform certain business intelligence (BI) operations. Advantageously, embodiments of the invention enable the BI administrator to manage the performance of BI operations at the cloud-based application provider, thereby alleviating the need of the cloud-based application provider to do so. The BI administrator may employ a model driven, tool agnostic multi-step code generation approach for administering business intelligence (BI) operations across a network. The invention is also applicable to an on premise offering of the software that a customer may run on their site.

According to one approach, the BI administrator manages the performance of analytical applications offered by data source providers, from vendors such as, but not limited to, SalesForce, ServiceNow, and NetSuite. The BI administrator issues instructions to perform certain BI operations across a network using the data source provider's own compute and storage capabilities. According to another approach, the BI administrator may manage BI operations for a company using a software stack of the BI administrator that resides within the data management ecosystem of the data source provider.

Architecture Overview

Figure 1:
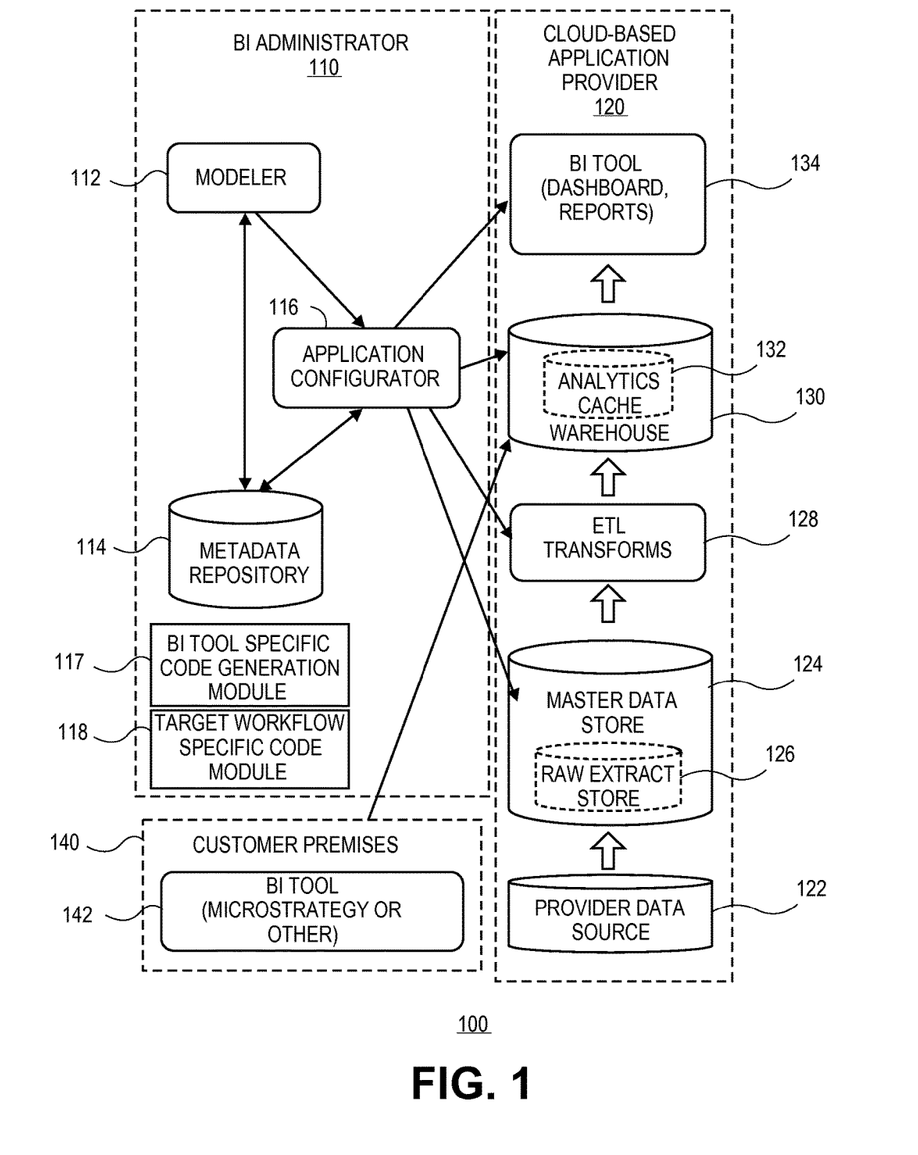
FIG. 1 is a block diagram of a system that performs BI processing for an entity across a network according to an embodiment of the invention.

FIG. 1 is a block diagram of an architecture 100 that enables BI processing for an entity across a network according to an embodiment of the invention. FIG. 1 depicts three different data management ecosytems, namely the data management ecosystems of BI administrator 110, cloud-based application provider 120, and customer 140. Customer 140 broadly refers to any entity which is a customer of cloud-based application provider 120.

As shown in FIG. 1, BI administrator operates modeler 112, metadata repository 114, and application configurator 116. Modeler 112 is a software application that may be used to define one or more schemas for storing metadata (such as star schemas which comprise one or more fact tables which reference any number of dimension tables). Modeler 112 may also provide an interface to allow the one or more schemas defined by modeler 112 to be mapped to entities and attributes available from provider data source(s) 122. Provider sources 122 correspond to a set of data sources used by cloud-based application provider 120. While modeler 112 and application configurator 116 are shown in FIG. 1 as being separate entities, in embodiments of the invention the functions performed by modeler 112 and application configurator 116 may be performed by a single entity or application or by a plurality of different entities or applications.

After modeler 112 defines the schema(s) and the mapping between the schema(s) and provider data source(s) 122, metadata defining the schema(s) and the mappings is stored in metadata repository 114. In addition to storing metadata defining schema(s) and mappings defined using modeler 112, metadata repository 114 also stores other types of information such as operational status and information obtained from cloud-based application provider 120. Operational status refers to information about executable jobs generated based on stored metadata. Operational status information might identify when a particular job started, what state the job is in, and if and when the job completed.

Application configurator 116 is an application that is designed to programmatically generate jobs that perform certain BI operations at cloud-based application provider 120. To illustrate, application configurator 116 may programmatically generate jobs that provision data repositories and move and transform data from provider data source(s) 122, to master data store 124, performing any needed ETL transformations 128, to be stored in warehouse 130. The activities will be described in more detail below.

Initially, application configurator 116 generates a job, which once executed, causes data to be extracted from provider data source(s) 122 and stored in raw extract store 126. Raw extract store 126 is a data store designed to store data extracted from provider data source(s) 122 in its native format.

Another job generated by application configurator 116, once executed, transforms the data stored in raw extract store 126 into a relational format with support for historical storage and stores the transformed data in Master Data Store 124. Master Data Store 124 is a data store used to store data transformed into a relational format (amenable for ETL processing) as well as temporary and persistent data structures needed by ETL processing. The data stored in Master Data Store (MDS) 124 may then be stored in a Source Dependent format or a Source Independent format, the latter being derived from the format natively used by Master Data Store (MDS) 124. Within Master Data Store (MDS) 124, incremental extracts are annotated to indicate which data records have been added, deleted or modified from the previous data extract as part of Change Data Capture (CDC) processing. Note that while raw extract store 126 is depicted in FIG. 1 as being a subset of Master Data Store (MDS) 124, in other embodiments Master Data Store (MDS) 124 and raw extract store 126 may be implemented as separate entities.

Thereafter, application configurator 116 generates a job, which once executed, causes ETL transforms 128 to be performed on data stored in Master Data Store 124; the data processed by ETL transforms 128 is then stored in data warehouse 130 by the performance of an executed job generated by application configurator 116. ETL transforms 128 perform operations such as delta identification and propagation, surrogate key generation and replacement, currency conversion, UOM conversion, data standardization, deduping and data profiling. Data warehouse 130 may store the data processed by ETL transforms 128 in a star schema format, which is a format amenable to the performance of analytical processing. Data warehouse 130 may also store information about standardized units of measurement (such as the value of currency at a particular point in time) to be used in interpreting the data stored therein. Note that while data warehouse 130 is depicted in FIG. 1 as being separate from Master Data Store 124 and raw extract store 126, in other embodiments one or more of Master Data Store (MDS) 124 and raw extract store 126 may be implemented using the same digital data store as data warehouse 130.

Data stored in data warehouse 130 may be cached in analytics cache 132 for use by business intelligence (BI) tool 134. BI tool 134 is an application that may use data stored in data warehouse 130, and potentially analytics cache 132, for querying, reporting, and analyzing data as well as other business intelligence functions. BI tool 134 may provide information to a user in a variety of different formats, such as reports, dashboards, and the like.

The BI tool 134 employed by cloud-based application provider 120 may not or need not be as sophisticated as the BI tools employed or supported by BI administrator 110. As such, additional modules or enhancements, such as analytics cache 132, may be needed on site at cloud-based application provider 120 to ensure that optimal analytical processing may be performed. To that end, it may be necessary to pre-compute data for certain reports and dashboards. The pre-computed data may be aggregated, summarized, or otherwise processed and provided to analytics cache 132. By storing such data within analytics cache 132, sophisticated reports and analysis may be obtained using BI tools 134 which may otherwise lack sophisticated query generation capabilities to produce such results without the aid of analytics cache 132.

Performing Cross-Cloud Business Intelligence

In an embodiment, data modeling may be performed by BI administrator 110, while ETL processing and reporting may be performed in a different cloud (i.e., the computing ecosystem of cloud-based application provider 120). FIG. 1 depicts an illustrative embodiment where BI administrator 110 performs ETL processing for an entity across a network according to an embodiment of the invention. Thus, in FIG. 1, the components of BI administrator 110 are in a separate cloud or data ecosystem from the components of cloud-based application provider 120, but the components of BI administrator 110 may communicate with the components of cloud-based application provider 120 over a network, such as the Internet.

In FIG. 1, application configurator 116 generates the executable code to provision data repositories and create jobs to process and move source data to data warehouse 130; however, the executable jobs created by application configurator 116 are executed at the computing ecosystem of cloud-based application provider 120 (rather than within the computing ecosystem of BI administrator 110), thereby leveraging cloud-based application provider's 120 compute and storage facilities and software tools.

In the model depicted by FIG. 1, data never leaves the computing ecosystem of cloud-based application provider 120. As such, raw extract store 126 may not be required, since the raw data is available to cloud-based application provider 120 locally at provider data source(s) 122. For example, if data can be extracted from provider data source(s) 122 in small enough batches to be processed in memory on site at cloud-based application provider 120, then raw extract store 126 may not be required and thus may be omitted from an implementation. Alternately, raw extract store 126 may be implemented in a format or using a mechanism more suited to storing small, incremental batches of data.

Software Stack at Cloud-Based Application Provider

In certain embodiments, some or all of the components of the software stack maintained by BI administrator 110 shown in FIG. 1 may be instead maintained by cloud-based application provider 120. To illustrate such an embodiment, consider FIG. 2, which is a block diagram of a system that performs BI processing for an entity comprising its own modeler 112, metadata repository 114, and application configurator 116 according to an embodiment of the invention.

Figure 2:
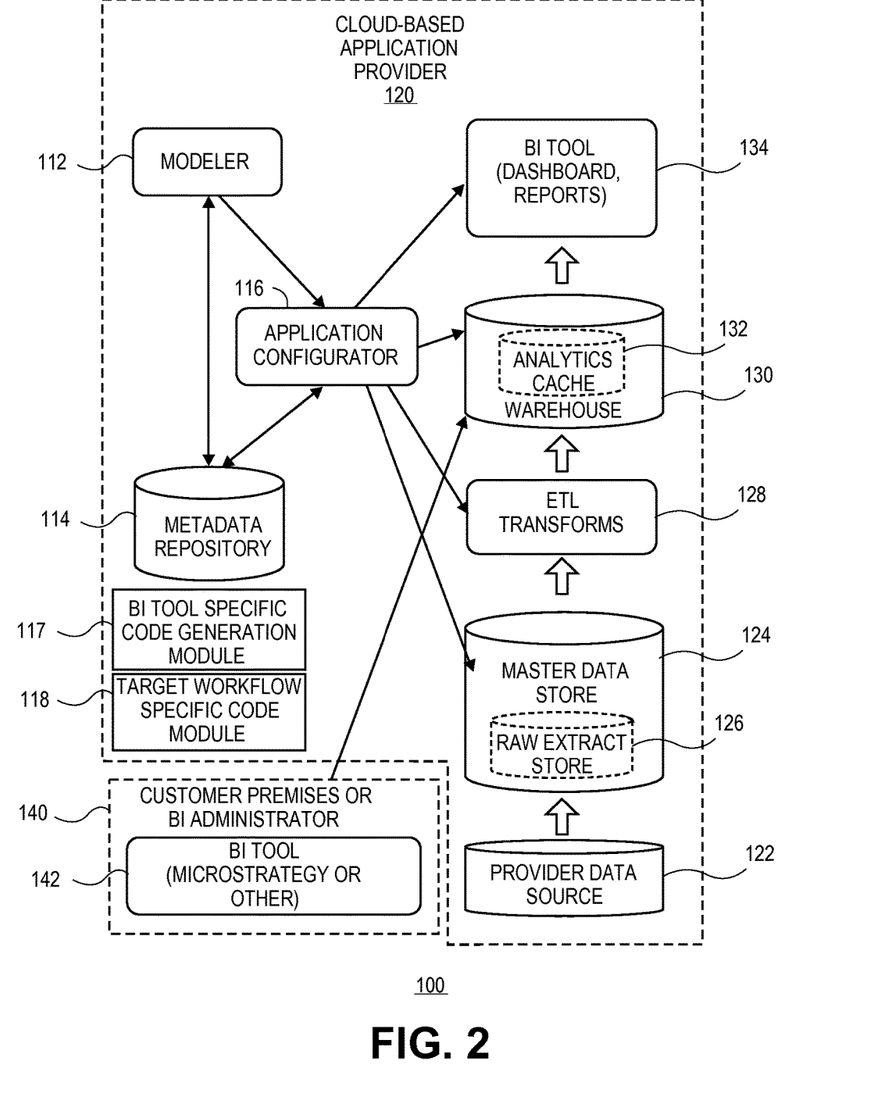
FIG. 2 is a block diagram of a system that performs BI processing for an entity comprising its own modeler, metadata repostiory, application configurator according to an embodiment of the invention.

Installing and integrating modeler 112, application configurator 116, and metadata repository 114 at a particular cloud-based application provider may be gracefully performed as modeler 112, application configurator 116, and metadata repository 114 are abstracted and decoupled from particular instances of UI technologies, BI tools, and/or ETL/Workflow orchestrator tools. If a particular cloud-based application provider wishes to use different preferred tool than provided by default by BI administrator 110, then the integrating modeler 112, application configurator 116, and metadata repository 114 may accommodate whatever tool or software the cloud-based application provider wishes to use by converting the intermediate format, generated by the application configurator 116 to the format specific to tools used by the application provider.

Software Stack at BI Administrator

Figure 3:
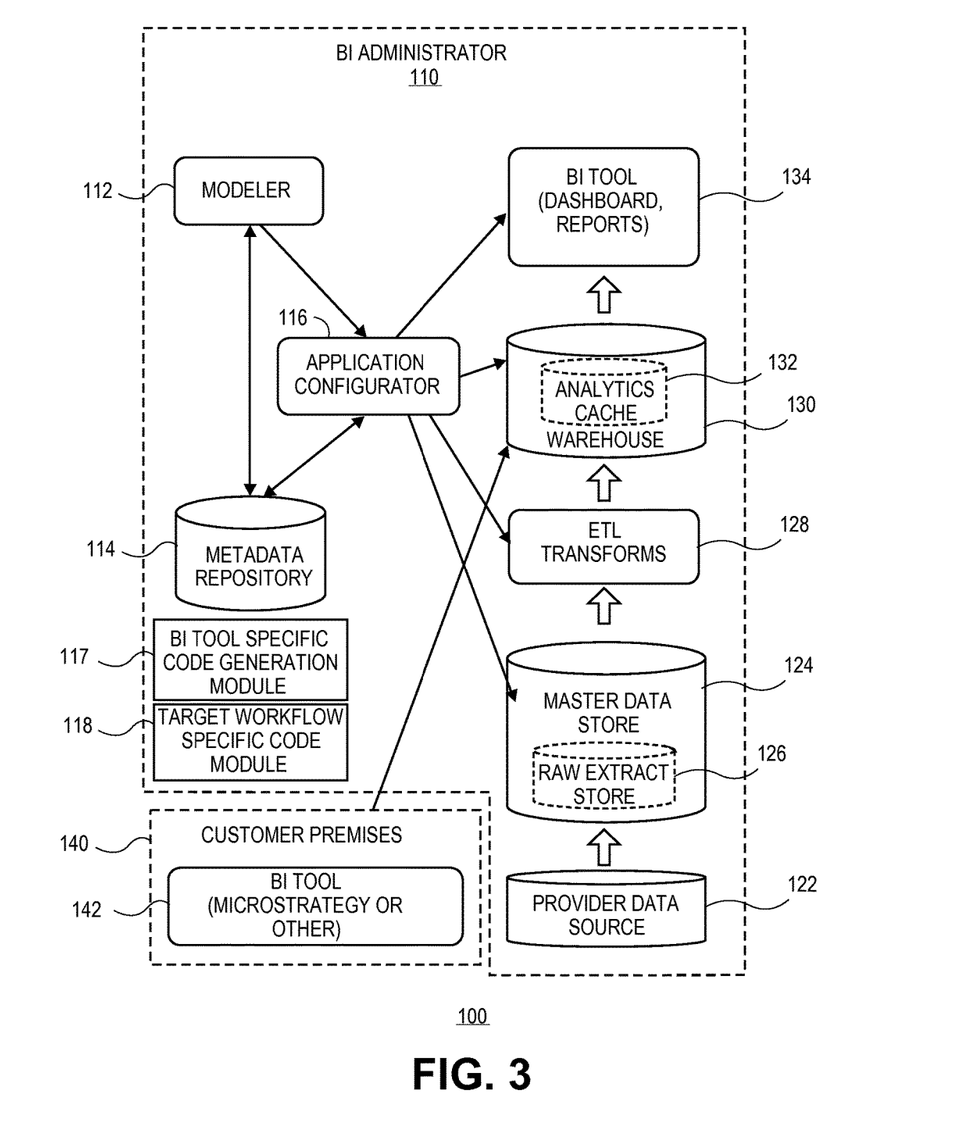
FIG. 3 is a block diagram of a system implemented at a BI administrator according to an embodiment of the invention.

In certain embodiments, some or all of the components of the software stack maintained by cloud-based application provider 120 shown in FIG. 1 may be instead maintained by BI administrator 110. To illustrate such an embodiment, consider FIG. 3, which is a block diagram of a system implemented at a BI administrator according to an embodiment of the invention. As shown in FIG. 3, provider data source 122, master data store 124, ETL transforms 128, data warehouse 130, and BI tool 134 all reside within the data ecosystem of BI administrator 110. This approach may be used to allow BI administrator 110 to manage data belonging to a customer and perform business intelligence operations using a multi-step code generation approach for the customer. The customer may access their data in this embodiment using a BI tool 142 at customer premises 140. Advantageously, BI administrator may operate all components of the software stack if desirable without the involvement of cloud-based application provider 120.

Software Stack at the Customer Premises

In certain embodiments, some or all of the components of the software stack maintained by BI administrator 110 and cloud-based application provider 120 shown in FIG. 1 may be instead maintained by a customer at customer premises 140. To illustrate such an embodiment, consider FIG. 4, which is a block diagram of a system implemented at customer premises 140 according to an embodiment of the invention.

Figure 4:
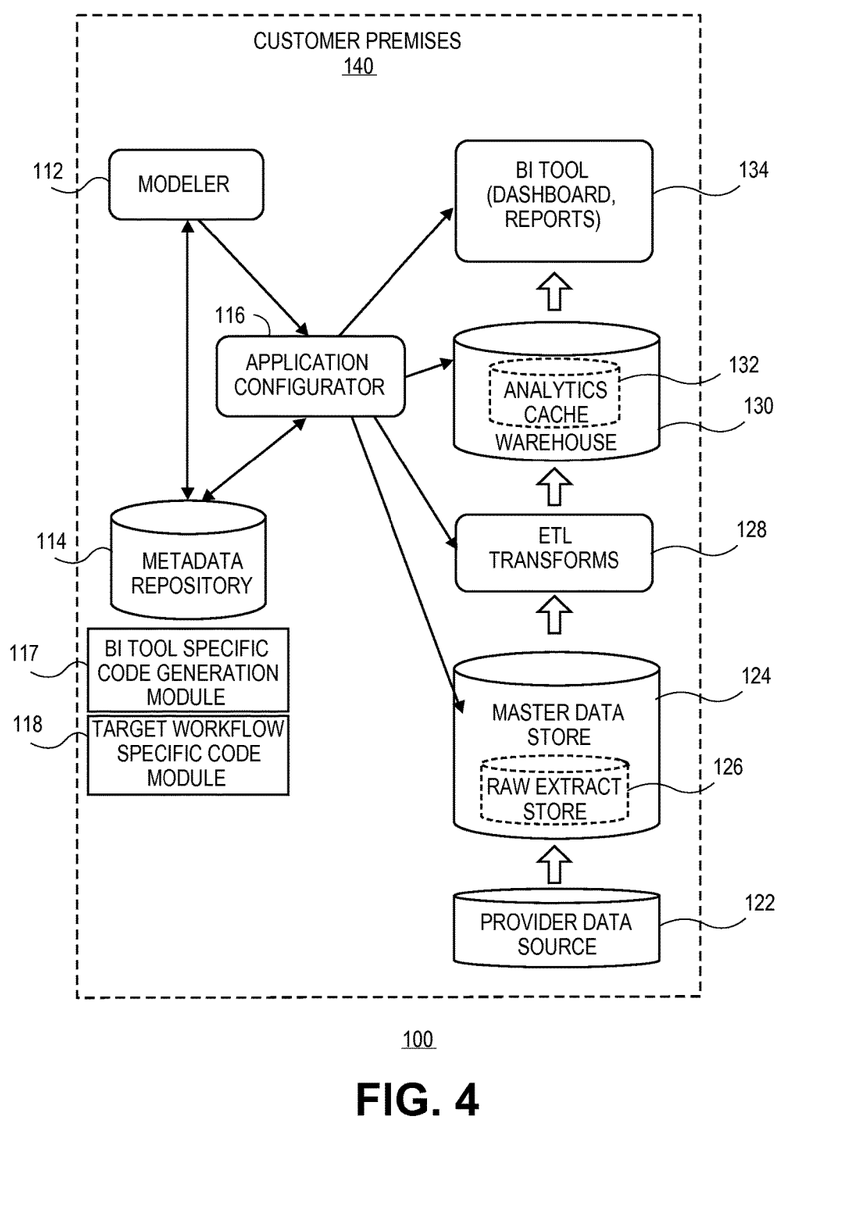
FIG. 4 is a block diagram of a system implemented at a customer premises according to an embodiment of the invention.

In FIG. 4, the customer maintains its own modeler 112, metadata repository 114, application configurator 116, BI Tool specific code generation module 117, and target workflow specific code module 118 according to an embodiment of the invention.

As shown in FIG. 4, provider data source 122, master data store 124, ETL transforms 128, data warehouse 130, and BI tool 134 all reside within the data ecosystem of customer premisis 140. This approach may be used to allow the customer to manage their own data on-site at customer premisis and allow the customer to perform business intelligence operations using a multi-step code generation approach for itself. The customer may access their data in this embodiment using a BI tool 134 at customer premises 140. Advantageously, the customer may operate all components of the software stack if desirable without the involvement of either BI administrator 140 or cloud-based application provider 120.

Tool Decoupling

BI administrator 110 may interact with a plurality of different cloud-based application providers. Each of these cloud-based application providers may wish to use either their own software or a different vendor's software to perform warehouse-based analytical processing, business intelligence analysis and processing, and ETL/workflow processing and management; thus, system 100 should be adaptable to support a variety of different tools and applications.

In support of this goal, the architecture of system 100 relies on intermediate formats for dimensional models, reports, and ETL job plans. Application configurator 116 may generate an intermediate dimensional model which is then converted to a specific format to be used by BI Tool 134 by a BI Tool specific code generation module 117, which may be a component within application configurator 116 or as separate module as shown in FIG. 1. Similarly, to support a wide variety of reports and dashboards, application configurator 116 may generate reports and/or dashboards in an intermediate format which is then converted to a BI Tool specific report or dashboard by BI Tool specific code generation module 117.

Likewise, to support a wide variety of ETL processing plans, application configurator 116 may generate an intermediate ETL Plan that is subsequently converted to ETL tool specific code or to workflow orchestrator specific code by a dedicated target specific code module 118. This is advantageous because if the target BI Tool or ETL tool/workflow orchestrator changes, then only the corresponding part of target specific code module 118 needs to be updated to accommodate or support that change. Embodiment of the invention may thus use a wide variety of workflow orchestrators. For example, an embodiment may use a workflow orchestrator that supports or offers a wide variety of input interfaces, such as without limitation: a specification based input interface, an application program interface (API) input interface, a user interface input interface, a server-style input interface, and a web server application program interface (API) input interface. The intermediate ETL Plan may be converted to workflow orchestrator specific code to support each of these types of workflow orchestrators by dedicated target workflow specific code module 118.

Intermediate Format

Embodiment of the invention may use an intermediate format when overseeing and managing a variety of different BI operations. U.S. patent application Ser. No. 14/276,678, entitled "Model Driven Reporting," filed May 13, 2014, discusses an intermediate BI Tool agnostic reporting format which may be used by embodiments of the invention. The disclosure of U.S. patent application Ser. No. 14/276,678 is incorporated by reference herein for all purposes as if fully set forth herein.

Many options exist for choosing the intermediate declarative plan format for ETL, for ex. the intermediate declarative plan format of an embodiment for ETL processing may be built on the WS-BPEL standard or may use an existing data specification language (DSL) from an open source tool such as Apache Camel.

Additionally, embodiments may use a custom language for describing the entire BI process end to end. An extension of that custom language may be used by embodiments as an intermediate declarative plan format. Such a custom language, as with all other intermediate formats discussed, may be human readable to aid with debugging and may be simple enough for power users to specify directly, thereby allowing the power users to bypass the user interface.

Such an intermediate declarative plan format may be additionally configurable to provide a more 'Concise' or 'Verbose' description of the plan format than the 'Default' level. To illustrate, the 'Concise' level may describe the ETL job labels (for example: Initial Fact Load, Incremental Fact Load with inputs), the 'Default' level may expand the abstract ETL job labels into constituent transforms and workflows, and the 'Verbose' level may additionally provide the SQL used in the ETL transforms. Embodiments of the invention are not limited to any particular type of specific intermediate format.

Workflow Models

Embodiments of the invention may use different ETL/workflow orchestrator tools. The particular ETL or workflow orchestrator tool employed by one embodiment may have different capabilities than those employed by another embodiment. Workflow tools typically have a published job specification format, and so target specific code module 118, responsible for converting the intermediate declarative plan to the target workflow tool executable format, would encapsulate the understanding of the workflow job specification format in its code. A workflow tool may also make publically available programmatic API's which may be used to generate workflows in the tools specific format. Some workflow tools may not offer published job specification formats or API's but may have a GUI to generate the flows; these workflow tools would require an automated way to drive the GUI or creation of several templates from the GUI and reverse engineering of the internal format of the templates to facilitate job specific updates.

In an embodiment, the workflow tool may operate functionally as a server that supports a language interface. In this embodiment, the module responsible for converting the intermediate declarative plan to an executable format by the workflow tool would issue language commands in the language of the interface of the workflow tool. In another embodiment, the workflow tool may expose a set of web services. In this embodiment, the module responsible for converting the intermediate declarative plan to an executable format by the workflow tool would have to orchestrate the invocation of the workflow tool's web services. Having the abstraction of an intermediate declarative plan and a clear separation of the target workflow specific code facilitates working with workflow tools of different capabilities as well as driving of workflows in one cloud environment (such as the computing ecosystem of BI administrator 110) to another (such as cloud-based application provider 120).

Hardware Mechanisms

Figure 5:
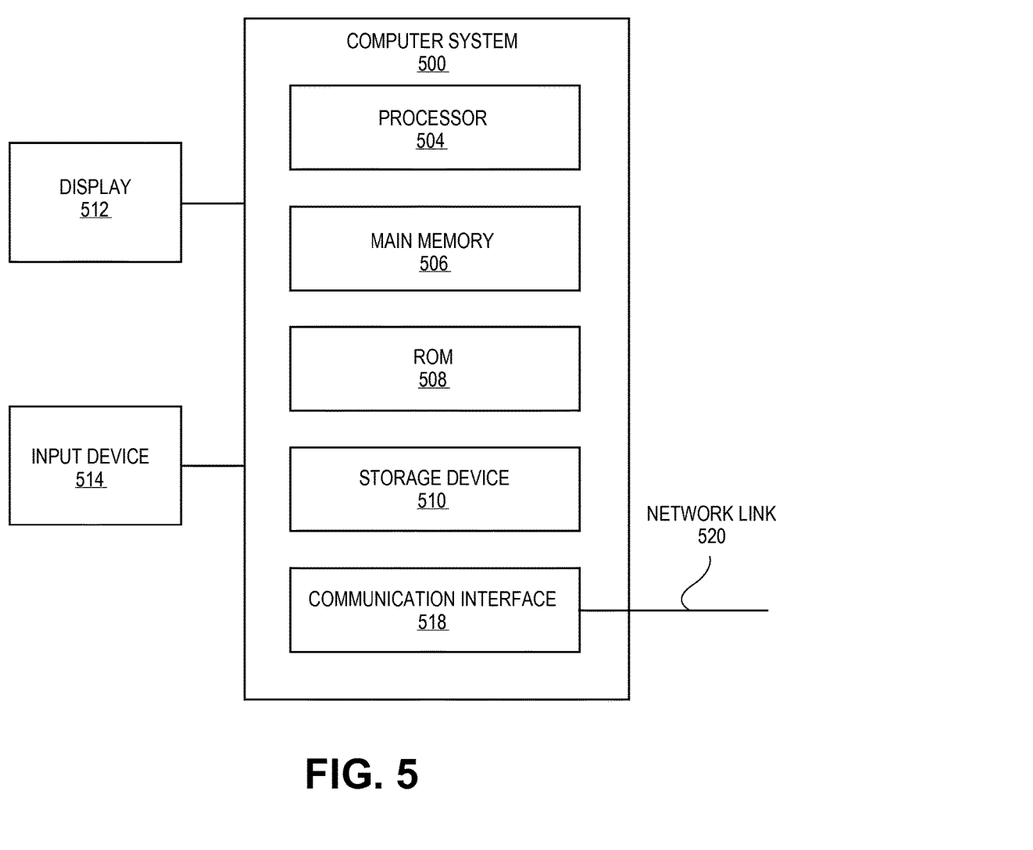
FIG. 5 is a block diagram that illustrates a computer system upon which an embodiment of the invention may be implemented.

In an embodiment, each of the software components depicted in FIGS. 1-4 may be implemented on one or more computer systems. FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments of the invention may include any number of input devices 514 coupled to computer system 500.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A non-transitory computer-readable storage medium storing one or more sequences of instructions for a source computing environment administering business intelligence processing at a target computing environment, which when executed by one or more processors, cause:

at the source computing environment, storing one or more intermediate design plans for creating dimensional models, reports, and extract, transform, and load (ETL) jobs for deployment in a plurality of different computing environments, wherein the one or more intermediate design plans comprise temporary information pertaining to design plans for creating dimensional models, reports, and ETL job plans in an intermediate declarative programming format stored in a client-side dynamic memory device that is convertible by the one or more processors to an executable application-specific format, wherein each one or more intermediate design plans describe ETL jobs sequencing and are expressed in a format independent of a particular ETL/workflow orchestrator tool, and wherein each of the different computing environments correspond to a different network environment than said source computing environment;

at the source computing environment, one or more decoupled target specific modules translating the one or more intermediate design plans into one or more target specific plans for dimensional models, reports, and extract, transform, and load (ETL) job plans which are interpretable or executable by a workflow engine at or accessible to the target computing environment; and the source computing environment, in consultation with the workflow engine, instructing the target computing environment to provision data repositories, create reports, and perform extract, transform, and load (ETL) processing based on the one or more target specific plans.

2. The non-transitory computer-readable storage medium of claim 1, wherein the workflow engine has an input interface corresponding to one or more of the following: a specification based input interface, an application program interface (API) input interface, a user interface input interface, a server-style input interface, and a web server application program interface (API) input interface.

3. The non-transitory computer-readable storage medium of claim 1, wherein execution of the one or more sequences of instructions further cause:

updating a BI/ETL tool specific code generation module associated with said particular target environment, without updating said one or more intermediate design plans, to provide support for a particular business intelligence (BI) tool or an ETL/workflow tool used by said target computing environment.

4. The non-transitory computer-readable storage medium of claim 1, wherein the one or more intermediate design plans are expressed in a human-readable format.

5. The non-transitory computer-readable storage medium of claim 1, wherein the one or more intermediate design plans are configurable to provide two or more different verbosity levels of human readable description.

6. The non-transitory computer-readable storage medium of claim 1, wherein the one or more target specific plans specifies that a set of data, which is included in one or more reports or dashboards that are generated by an application at said target computing environment, be pre-computed at the target computing environment, and wherein said application has been pre-identified as lacking a specified level of processing capability.

7. A non-transitory computer-readable storage medium storing one or more sequences of instructions for administering business intelligence processing at a target computing environment, which when executed by one or more processors, cause:

at the target computing environment, storing one or more intermediate design plans for creating dimensional models, reports, and extract, transform, and load (ETL) jobs for deployment at the target computing environments, wherein the one or more intermediate design plans comprise temporary information pertaining to design plans for creating dimensional models, reports, and ETL job plans in an intermediate declarative programming format stored in a client-side dynamic memory device that is convertible by the one or more processors to an executable application-specific format, and wherein each one or more intermediate design plans describe ETL jobs sequencing and are expressed in a format independent of a particular ETL/workflow orchestrator tool;

at the target computing environment, one or more decoupled target specific modules translating the one or more intermediate design plans into one or more target specific plans for the dimensional models, reports, and extract, transform, and load (ETL) job plans which are interpretable or executable by a workflow engine at or accessible to the target computing environment; and the target computing environment using the workflow engine to provision data repositories, create reports, and perform extract, transform, and load (ETL) processing based on the one or more target specific plans.

8. The non-transitory computer-readable storage medium of claim 7, wherein execution of the one or more sequences of instructions further cause:

updating a BI tool specific code generation module to provide support for a new business intelligence (BI) tool or an ETL/workflow tool used by the target computing environment without updating said one or more intermediate design plans.

9. The non-transitory computer-readable storage medium of claim 7, wherein the workflow engine has an input interface corresponding to one or more of the following: a specification based input interface, an application program interface (API) input interface, a user interface input interface, a server-style input interface, and a web server application program interface (API) input interface.

10. The non-transitory computer-readable storage medium of claim 7, wherein the one or more intermediate design plans are expressed in a human-readable format.

11. The non-transitory computer-readable storage medium of claim 7, wherein the one or more intermediate design plans are configurable to provide two or more different verbosity levels of human readable description.

12. The non-transitory computer-readable storage medium of claim 7, wherein the one or more target specific plans specifies that a set of data, which is included in one or more reports or dashboards that are generated by an application at said target computing environment, be pre-computed at the target computing environment, and wherein said application has been pre-identified as lacking a specified level of processing capability.

13. An apparatus, residing at a source computing environment, for administering business intelligence processing at a target computing environment, comprising:

one or more processors; and one or more non-transitory computer readable storage mediums storing one or more sequences of instructions, which when executed, cause:

at the source computing environment, storing one or more intermediate design plans for creating dimensional models, reports, and extract, transform, and load (ETL) jobs for deployment in a plurality of different computing environments, wherein the one or more intermediate design plans comprise temporary information pertaining to design plans for creating dimensional models, reports, and ETL job plans in an intermediate declarative programming format stored in a client-side dynamic memory device that is convertible by the one or more processors to an executable application-specific format, wherein each one or more intermediate design plans describe ETL jobs sequencing and are expressed in a format independent of a particular ETL/workflow orchestrator tool, and wherein each of the different computing environments correspond to a different network environment than said source computing environment;

at the source computing environment, one or more decoupled target specific modules translating the one or more intermediate design plans into one or more target specific plans for the dimensional models, reports, and extract, transform, and load (ETL) job plans which are interpretable or executable by a workflow engine at or accessible to the target computing environment; and the source computing environment, in consultation with the workflow engine, instructing the target computing environment to provision data repositories, create reports, and perform extract, transform, and load (ETL) processing based on the one or more target specific plans.

14. The apparatus of claim 13, wherein the workflow engine has an input interface corresponding to one or more of the following: a specification based input interface, an application program interface (API) input interface, a user interface input interface, a server-style input interface, and a web server application program interface (API) input interface.

15. The apparatus of claim 13, wherein execution of the one or more sequences of instructions further cause:

updating a BI/ETL tool specific code generation module associated with said particular target environment, without updating said one or more intermediate design plans, to provide support for a particular business intelligence (BI) tool or an ETL/workflow tool used by said target computing environment.

16. The apparatus of claim 13, wherein the one or more intermediate design plans are expressed in a human-readable format.

17. The apparatus of claim 13, wherein the one or more intermediate design plans are configurable to provide two or more different verbosity levels of human readable description.

18. The apparatus of claim 13, wherein the one or more target specific plans specifies that a set of data, which is included in one or more reports or dashboards that are generated by an application at said target computing environment, be pre-computed at the target computing environment, and wherein said application has been pre-identified as lacking a specified level of processing capability.

19. An apparatus for administering business intelligence processing at a target computing environment, comprising:
one or more processors; and
one or more non-transitory computer readable storage mediums storing one or more sequences of instructions, which when executed, cause:
at the target computing environment, storing one or more intermediate design plans for creating dimensional models, reports, and extract, transform, and load (ETL) jobs for deployment at the target computing environments, wherein the one or more intermediate design plans comprise temporary information pertaining to design plans for creating dimensional models, reports, and ETL job plans in an intermediate declarative programming format stored in a client-side dynamic memory device that is convertible by the one or more processors to an executable application-specific format, and wherein each one or more intermediate design plans describe ETL jobs sequencing and are expressed in a format independent of a particular ETL/workflow orchestrator tool;
at the target computing environment, one or more decoupled target specific modules translating the one or more intermediate design plans into one or more target specific plans for the dimensional models, reports, and extract, transform, and load (ETL) job plans which are interpretable or executable by a workflow engine at or accessible to the target computing environment; and
the target computing environment using the workflow engine to provision data repositories, create reports, and perform extract, transform, and load (ETL) processing based on the one or more target specific plans.

20. The apparatus of claim 19, wherein execution of the one or more sequences of instructions further cause:
updating a BI tool specific code generation module to provide support for a new business intelligence (BI) tool or an ETL/workflow tool used by the target computing environment without updating said one or more intermediate design plans.

21. The apparatus of claim 19, wherein the workflow engine has an input interface corresponding to one or more of the following: a specification based input interface, an application program interface (API) input interface, a user interface input interface, a server-style input interface, and a web server application program interface (API) input interface.

22. The apparatus of claim 19, wherein the one or more intermediate design plans are expressed in a human-readable format.

23. The apparatus of claim 19, wherein the one or more intermediate design plans are configurable to provide two or more different verbosity levels of human readable description.

24. The apparatus of claim 19, wherein the one or more target specific plans specifies that a set of data, which is included in one or more reports or dashboards that are generated by an application at said target computing environment, be pre-computed at the target computing environment, and wherein said application has been pre-identified as lacking a specified level of processing capability.

* * * * *